UNITED STATES PATENT OFFICE.

BENNO BORZYKOWSKI, OF CHARLOTTENBURG, GERMANY.

PROCESS OF PRODUCING CUPRAMMONIUM SOLUTIONS.

1,100,518.   Specification of Letters Patent.   Patented June 16, 1914.

No Drawing.   Application filed November 18, 1912. Serial No. 732,051.

*To all whom it may concern:*

Be it known that I, BENNO BORZYKOWSKI, a subject of the Russian Emperor, and resident of Charlottenburg, Germany, have invented a certain new and useful Improvement in Processes of Producing Cuprammonium Solutions, of which the following is a specification.

In the production of cuprammonium-cellulose solutions in order to obtain artificial silk, and other cellulose products it is desirable that the solution should contain as little ammonia as possible because this adversely affects the properties of the threads, and other products, produced therefrom, and must later be again removed therefrom. The presence of a certain amount of ammonia in the solution is however necessary in order to maintain the copper and cellulose in solution; on the other hand the facility of the cuprammonium hydroxid solution to dissolve cellulose increases with the copper content of the same.

The present process has for its object to increase the copper content of the cuprammonium solution, produced in known manner, without increasing the ammonia content. The most direct method for this purpose would be simply to add more copper hydroxid to the solution but for the fact that the latter is only soluble in this solution to a small extent and remains mostly undissolved, when it is added to the prepared cuprammonium hydroxid solution. It has now been found that an increase in the copper content can be effected with good results when a somewhat round-about method is employed, for example when the preparation of the copper hydroxid is effected within the solution, in which case the hydroxid is at once dissolved. For this purpose the process is carried out by adding to the cuprammonium solution to be enriched, copper sulfate and an equivalent amount of alkali hydroxid, both in aqueous solution. As a result alkali sulfate and free copper hydroxid are produced in accordance with the well known reaction; the latter dissolves at once in the cuprammonium hydroxid solution and in this manner produces the desired increase in the copper content.

In accordance with the present process a highly concentrated solution can be obtained which is capable of dissolving larger amounts of cellulose than those previously prepared and from such resulting solution solid products of unobjectionable consistency and fine appearance can be obtained.

Example: 50 parts of cuprammonium hydroxid solution (of specific gravity 1.000 to 1.004) and 17 parts of an aqueous copper sulfate solution (27 grams per liter of water) are mixed and thoroughly stirred; then 10 parts of 15% caustic soda solution are added and, after stirring for a short time, to 800 liters of this mixture about 107 kilograms of dry loose cellulose are added.

I claim:—

1. A process of increasing the copper content of cuprammonium hydroxid solutions, which comprises adding a soluble copper salt and a soluble hydroxid thereto.

2. A process of increasing the copper content of cuprammonium hydroxid solutions, which comprises adding a solution of copper sulfate and a soluble hydroxid thereto.

3. A process of increasing the copper content of cuprammonium hydroxid solutions, which comprises adding a soluble copper salt and caustic soda solution thereto.

4. A process of increasing the copper content of cuprammonium hydroxid solutions, which comprises adding a solution of copper sulfate and a solution of caustic soda thereto.

5. A process of increasing the copper content of cuprammonium hydroxid solutions, which comprises adding reagents thereto which are capable of producing a precipitate of copper hydroxid.

In testimony whereof I have signed my name to this specification in the presence of two subscribing witnesses.

BENNO BORZYKOWSKI.

Witnesses:
HENRY HASPER,
WOLDEMAR HAUPT.